July 19, 1960
C. M. RALLIS
2,945,598
ROTARY FOOD HOLDER FOR COOKING MACHINE
Filed Oct. 27, 1958
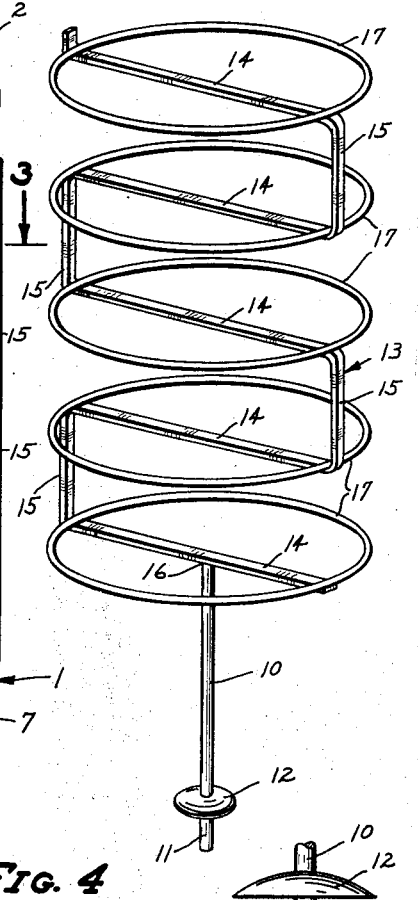
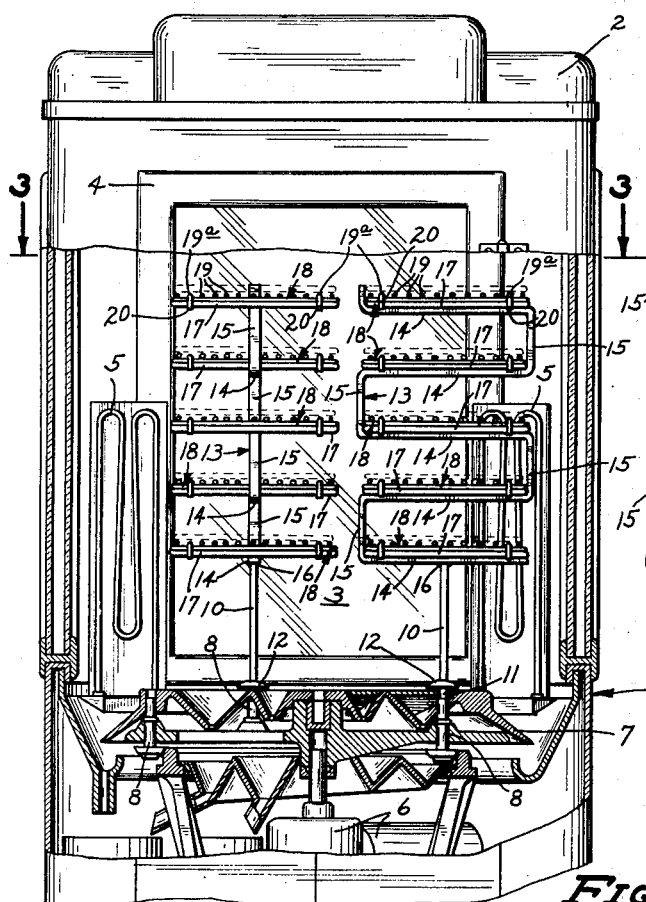
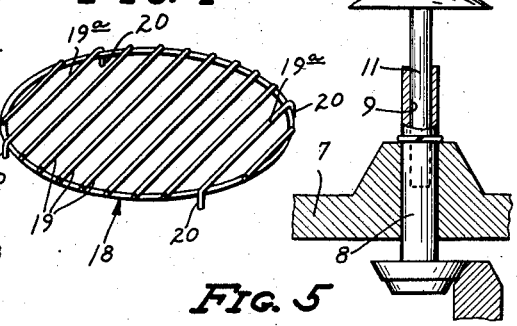
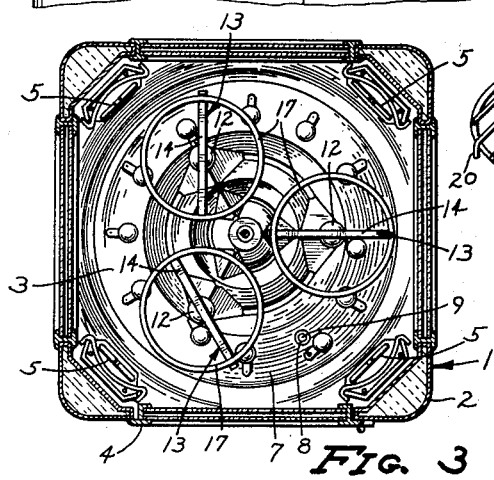
INVENTOR.
CONSTANTINE M. RALLIS
BY
Merchant & Merchant
ATTORNEYS

United States Patent Office 2,945,598
Patented July 19, 1960

2,945,598

ROTARY FOOD HOLDER FOR COOKING MACHINE

Constantine M. Rallis, 4241 Standish Ave. S., Minneapolis, Minn.

Filed Oct. 27, 1958, Ser. No. 769,626

1 Claim. (Cl. 211—144)

My invention relates generally to food cooking devices and more particularly to improvements in food cooking devices of the type wherein food is rotated in the presence of and cooked by a source of radiant heat.

Still more particularly, my invention relates to improvements in mechanical cooking machines of the type disclosed in Patent 2,565,786, and has for its primary object the provision of a novel, highly effective and inexpensive device for holding food items in said cooking machines.

A further object of my invention is the provision of a device of the type immediately above described which provides a plurality of vertically spaced food-receiving racks or shelves which are mounted for common rotation and which provides a maximum of exposure of the food mounted on the shelves to the source of radiant heat.

A further object of my invention is the provision of a device of the class immediately above described which provides a maximum of access to the food to facilitate loading and unloading the several shelves.

A still further object of my invention is the provision of a device of the class above described which may be formed from a minimum of material and with a minimum of skill and labor.

A still further object of my invention is the provision of a device of the class above described which is extremely easy to attach to and remove from the machine, and which is extremely easy to maintain in a clean sanitary condition.

The above and still further objects of my invention will become apparent from the following detailed specification, appended claim and attached drawings.

Referring to the drawings wherein like characters indicate like parts throughout the several views:

Fig. 1 is a view in perspective of my novel food holder;

Fig. 2 is a view in front elevation of a cooking machine showing a pair of my novel food holders in position thereon, some parts being broken away and some parts shown in section;

Fig. 3 is a view in horizontal section as seen substantially from the line 3—3 of Fig. 2;

Fig. 4 is a perspective view of a grid element used in connection with my invention; and Fig. 5 is an enlarged fragmentary view of the lower end portion of my novel structure, illustrating its mounting and driving means.

Referring with greater particularity to the drawings, the numeral 1 indicates in its entirety a cooking machine of the type disclosed in prior Patent 2,565,786, the housing thereof being identified by the numeral 2, the cooking chamber by 3, and the door in the housing 2 leading to the cooking chamber 3 by the numeral 4. A source of radiant heat about the periphery of the cooking chamber 3, shown as being in the nature of conventional electric heating elements, is identified by the numeral 5.

As in the structure of the above identified prior patent, an electric motor 6 is mounted below the cooking chamber 3 for imparting rotation not only to a ring-like circular conveyor 7, but also to a plurality of circumferentially spaced vertically disposed rotary shafts 8 carried by said conveyor 7. As shown, each of the shafts 8 is provided with an upwardly opening socket 9.

My novel food holder for use in food machines of the type above described comprises a vertically disposed spindle 10, the lower end 11 of which is adapted to be snugly received in the socket 9 of one of the rotary shafts 8, for rotation therewith. Preferably and as shown, an annular shield 12 having a convex upper surface is provided in spaced relation to the extreme lower end 11 of the spindle 10 for preventing drippings from accumulating in the socket 9.

Carried by the spindle 10 is an upright zigzag supporting frame 13, preferably and as shown formed from a single length of metal rod stock and bent only at right angles at spaced points therealong to provide a plurality of horizontally disposed mounting members 14 in overlying vertically spaced relationship and a plurality of staggered vertically disposed connecting members 15. As shown the upper end of the spindle 10 is secured to the longitudinal center of the lowermost of the connected mounting members 14, as indicated at 16.

Rigidly secured to each of the mounting members 14, as by welding, in concentric relationship, are frame elements 17, shown as being circular. Adapted to be supported on each of the frame elements 17 are perforate grid elements 18, also shown as being circular in shape and having spaced parallel metallic rods 19 carried thereby for the reception of food items placed thereon. As shown, the rods 19a on opposite sides thereof have downturned end portions 20 which overlap the circular frame elements 17 and maintain the grid elements 18 in centered relationship with respect thereto during rotation.

My invention has been thoroughly tested and found to be completely satisfactory for the accomplishment of the above objects and while I have shown a preferred embodiment thereof, it should be understood that same may be capable of modification without departure from the scope and spirit of the appended claim.

What I claim is:

A device of the class described, a vertically disposed spindle, an upright zigzag supporting frame carried by said spindle, said supporting frame being formed from a single length of metallic rod stock and bent only at right angles at spaced points therealong to define a plurality of connected horizontally disposed mounting members in overlying vertically spaced relationship, and endless frame elements one each mounted on one of said mounting members in concentric relationship to each other and to the spindle.

References Cited in the file of this patent

UNITED STATES PATENTS

| | | |
|---|---|---|
| 719,441 | Davison | Feb. 3, 1903 |
| 2,482,601 | Spartalis | Sept. 20, 1949 |
| 2,842,043 | Reuland | July 8, 1958 |

FOREIGN PATENTS

| | | |
|---|---|---|
| 209,138 | Switzerland | June 17, 1940 |